United States Patent [19]

Uenishi et al.

[11] Patent Number: 5,251,060
[45] Date of Patent: Oct. 5, 1993

[54] LIGHT-SOURCE UNIT

[75] Inventors: Naota Uenishi; Takafumi Uemiya, both of Osaka, Japan

[73] Assignee: Sumitomo Electric Industries, Ltd., Osaka, Japan

[21] Appl. No.: 953,241

[22] Filed: Sep. 30, 1992

[30] Foreign Application Priority Data

Sep. 30, 1991 [JP] Japan .................. 3-79216[U]

[51] Int. Cl.$^5$ ............................................ H03F 7/00
[52] U.S. Cl. .................... 359/328; 359/710; 385/122; 385/142; 385/145
[58] Field of Search ............... 359/326, 327, 328, 329, 359/330, 331, 332, 206, 207, 708, 710, 721; 385/122, 33, 142, 145

[56] References Cited

U.S. PATENT DOCUMENTS 4,972,422 11/1990 Tatsuno ........................... 372/22

FOREIGN PATENT DOCUMENTS 64-73327 3/1989 Japan .

Primary Examiner—Frank Gonzalez
Attorney, Agent, or Firm—Cushman, Darby & Cushman

[57] ABSTRACT

A light source unit for receiving and transmitting information to and from an optical disk or the like, which reshapes an elliptical in cross-section beam of laser light into a circular in cross-section beam of laser light by a beam shaping assembly composed of at least one lens having a cylindrical surface and an optical axis, the cylindrical surface having generatrix lines that are perpendicular to the optical axis of the lens, where the circularly shaped beam of laser light then enters a wavelength converter for generation of a second harmonic (half wavelength of the fundamental).

19 Claims, 3 Drawing Sheets

LIGHT-SOURCE UNIT

BACKGROUND OF THE INVENTION

1. Field of the Invention

The present invention relates to a light source unit used for reading optical disks and the like. More specifically the invention is directed to a laser light source unit which provides a harmonic of laser light generated by a laser source which provides the fundamental wavelength of laser light.

2. Description of the Prior Art

Typical devices used to convert the wavelength of light from a fundamental wave to a secondary harmonic wave include the optical-fiber, optical-waveguide, and the bulk type light-wavelength conversion modules. In each, a fundamental wave produced by a low-output semiconductor laser light source or the like, utilizing inter-band transition of a semiconductor, is directed into a wavelength conversion element. The conversion element then outputs the second harmonic wave of the fundamental wave, which is then used, for example, to read an optical disc.

The nonlinear optical effect is the phenomenon by which the second harmonic wave, the sum-frequency wave, the differential-frequency wave or the like are created. The nonlinear optical effect is the phenomenon that polarization proportional to the quadratic and higher-power terms of the electric field of light takes place when the light enters into a medium.

Materials in which such a phenomenon are generated are called nonlinear optical materials. Inorganic nonlinear optical materials such as $KH_2PO_4$, $LiNbO_3$, $LiTaO_3$, and the like are well known. Furthermore, organic materials represented by 2-methyl-4-nitrileaniline (MNA), 4-dimethylamino-3-acetoamidnitrobenzene (DAN), and 3, 5-dimethyl-1-(4-nitrophenyl) pyrazole (DMNP) have recently been found to be suitable nonlinear optical materials because of their large nonlinear optical constants.

In order to create secondary harmonic waves from the fundamental wave, it is important that the converter is designed to confine the fundamental waves of laser light at a high density of energy and have a large length of interaction with the fundamental waves.

Such a converter includes the light wave passage type where a slender light wave passage portion through which light is propagated while being confined therein is formed on a base plate that is coated with an upper layer. See FIG. 6. To pass secondary higher harmonics generated in the light wave passage portion or the like, the light wave passage of the converter needs to have such constitution as to cope with the propagation phase velocity of the secondary higher harmonics generated from the fundamental waves, or the fundamental waves and the secondary higher harmonics need to be matched with each other in phase. There are various conceivable methods for such matching. The simplest of the methods is the Cerenkov radiation method.

Referring to FIG. 6 for a converter of the light wave passage type, suppose that secondary higher harmonics are generated, at a point A, from light being propagated in a light wave passage portion 91, and go out of the portion 91 into a base plate 92 and an upper layer 93 at an angle $\alpha$ thereto, and other secondary higher harmonics are generated, at another point B, from the light a unit time after the generation of the former harmonics, and proceed at the same angle $\alpha$. If the equal phases of the secondary higher harmonics proceeding from the point A coincide with the equal phases of the other secondary higher harmonics proceeding from point B, both sets of harmonics go out of the light wave passage portion 91 at the angle $\alpha$ thereto. This phenomenon is called Cerenkov radiation. If $n_S(w)$ the refractive index of the base plate 92 to the fundamental waves of the light, $n_G(w)$ the refractive index of the wave passage portion 91 to the waves, and the $n_S(2w)$ the refractive index of the base plate to the secondary higher harmonics have a relationship expressed by the inequality $$n_S(2w) > n_G(w) > n_S(w) \tag{1}$$

then the fundamental waves and the higher harmonics are automatically matched with each other in phase to enable the Cerenkov radiation. However, since secondary higher harmonics which are radiated from the light wave passage portion 91 into the base plate 92 of larger thickness are diminished, the light proceeding out of the end portion has a crescent cross-section. It is difficult to condense the light of the crescent cross-section to a small spot. For that reason, it is difficult to use a wavelength converter of the light wave passage type for a light source unit which is to be used for purposes such as writing and reading information to and from an optical storage medium including an optical disk.

Referring to FIG. 7 for a wavelength converter 100 which is of the optical fiber type and in which the refractive indices of the core 101 and outer portion 102 of the converter have the same relationship as those of the FIG. 6 light wave passage portion 91, base plate 92, and upper layer 93 as expressed by inequality (1), secondary higher harmonics 103 going out from the end surface of the converter spread to form a rotatively symmetrical ring on the front of the converter, as shown in FIG. 7. For that reason the light condensing property of the optical fiber type converter is good. The harmonics 103 can be easily collimated into mutually parallel rays by a conical lens or a Fresnel lens. The rays can be condensed to a diffraction-limit light spot. Since the wavelength converter of the optical fiber type is not only good in light condensing property but also small in size and weight, it can be expected to be integrated with a semiconductor laser module in a compact package so that the assembly is used as an optical disk reading light source unit or the like.

A light source unit including a wavelength converter of the optical fiber type was disclosed in the Japan Patent Application (OPI) No. 73327/89 (the term "OPI" as used herein means an "unexamined published application"). FIG. 8 shows the constitution of the light source unit in which laser light generated by a semiconductor laser module 21 is collimated into mutually parallel rays by a collimation lens 22. Since the beam of the rays has an elliptic cross-section, the section is shaped into a circular one by an anamorphic pair of lenses 23. After the shaping, the direction of the polarization of the laser beam is altered by a phase difference plate 25. The beam is then condensed, and entered into the core 11 of the wavelength converter 10 through the light incoming and surface 10a thereof. The converter 10 includes the core 11, and an outer portion 12 surrounding the core. The refractive indices of the core 11 and the outer portion 12 have the same relationship as those of the light wave passage portion 91, the base plate 92, and the upper layer 93 as expressed by the inequality (1). In the converter 10, the laser beam acts as fundamental waves for Cerenkov radiation so that secondary higher harmonics are generated and go out as converted light from the light outgoing end surface 10b of the converter before spreading to form a ring on the front of the harmonics. The converted light is condensed by a condensation lens 27, and then removed of fundamental wave components by a band-pass filter 28. The converted light is finally used for the reading of an optical disk or for the like.

Since the anamorphic pair of lenses 23 are used to shape the elliptic cross-section of the beam coming out from the collimation lens 22, the optical path of the beam is inevitably bent. For that reason, the light source unit cannot be made compact as a whole, causing a great disadvantage if the unit is to be used for an optical disk reading pickup or the like.

SUMMARY OF THE INVENTION

It is an object of the present invention to solve the above-mentioned problem, by providing light source unit components in which the optical axis of laser light remains straight to render it easy to make the unit compact.

A light source unit according to the present invention includes a semiconductor laser module; a collimation lens by which the laser light generated by the laser module is changed into mutually parallel rays; a beam shaping means for circularly shaping the cross-section of a laser beam consisting of the rays transmitted from the lens to the means; a condensation lens for condensing the beam transmitted from the means; and a wavelength converter which can be of the optical fiber type with a core and an outer portion surrounding the core and in which either the core or the portion surrounding the core, or both, are made of a nonlinear optical substance, and the beam condensed by the condensation lens is entered as fundamental waves into the core through the light incoming end surface of the converter so that secondary higher harmonics are generated from the fundamental waves and come out as converted light from the light outgoing end surface of the converter. The light source unit is characterized in that the beam shaping means is made of one or more lenses having cylindrical surfaces, the generatrix lines for which are perpendicular to the optical axis of the means.

Since the light generated by the semiconductor laser module of the light source unit provided in accordance with the present invention is includes divergent light, it is collimated into the mutually parallel rays by the collimation lens. Generally, the laser beam consisting of the rays has an elliptic cross-section, and would therefore make an elliptic spot if the beam were condensed without being circularly shaped in advance. If the beam condensed without being circularly shaped in advance were entered into the circular cross-section end of the core of the wavelength converter, the discrepancy in mode field pattern for the fundamental waves in the converter would be larger and would thus lower the efficiency of incident laser light fundamental waves in the core or the efficiency of coupling, decreasing the efficiency of wavelength conversion. For that reason, the cross-section of the beam is circularly shaped, and the beam is preferably thereafter condensed by the condensation lens.

The beam shaping means for circularly shaping the elliptic cross-section of the beam is made of one or more lenses having the cylindrical surfaces, the generatrix lines for which are perpendicular to the optical axis of the means. The elliptic cross-section of the beam is enlarged in the direction of the minor axis of the section or reduced in the direction of the major axis thereof by the means so that the section is circularly shaped. The lenses having the cylindrical surfaces enlarge or reduce the elliptic cross-section without bending the optical path of the beam.

DETAILED DESCRIPTION OF THE PREFERRED EMBODIMENT

A preferred embodiment of the invention is described in detail with reference to the drawings attached hereto.

Figure 1:
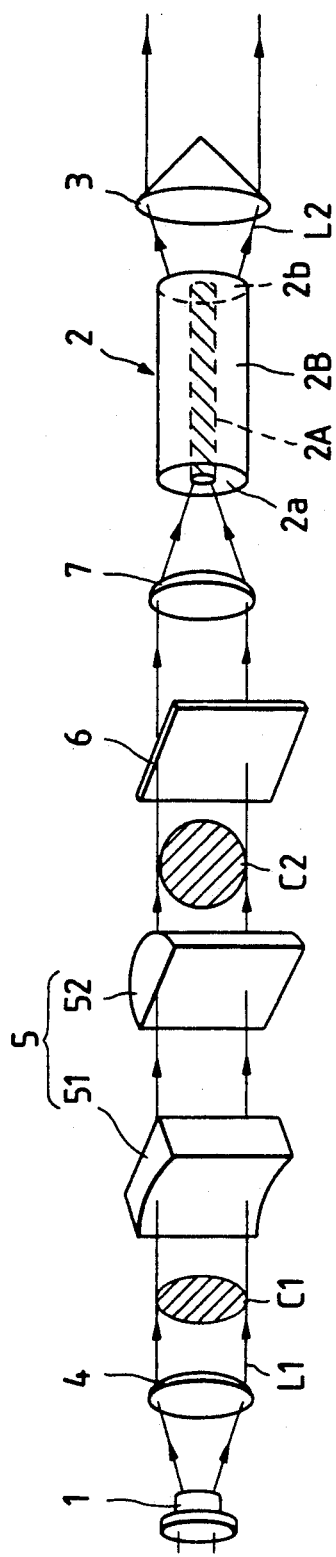
FIG. 1 is a schematic view of a light source unit which is an embodiment of the present invention.
Figure 8:
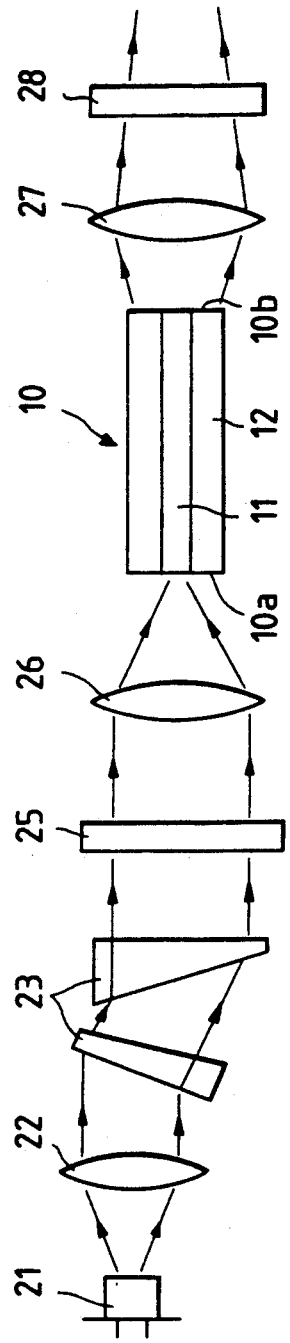
FIG. 8 is a schematic view of a light source unit using conventional noncylindrical.

FIG. 1 is a schematic view of the light source unit according to the present invention. Laser light L1 is generated by a semiconductor laser module 1.

The laser light L1 generated by the semiconductor laser module 1 is collimated into mutually parallel rays by a collimation lens 4. The beam of rays coming out from lens 4 has an elliptic cross-section C1, which is shaped into a circular one C2 by a beam shaping lens assembly 5 constituted by a combination of cylindrical lenses 51 and 52. Next the direction of the polarization of the laser light L1 is altered by a phase difference plate 6, and then the laser light is condensed by a condensation lens 7 before it enters into the core 2A of an optical fiber type wavelength converter 2 through the light incoming end surface 2a thereof. The core 2A is shown by a hatching in FIG. 1. The laser light exiting the end surface 2b of the converter has been converted so as to include harmonics of the fundamental wavelength and this laser light is next collimated into mutually parallel rays by a collimation lens 3 before the laser light exits the light source unit.

Figure 6:
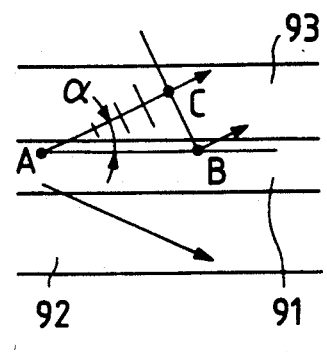
FIG. 6 is a view to illustrate Cerenkov radiation.
Figure 7:
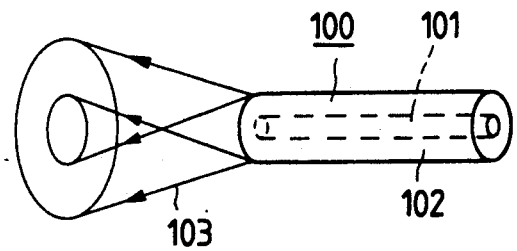
FIG. 7 is a view to illustrate the form of a beam coming out from a wavelength converter of the optical fiber type.

The wavelength converter 2 includes the core 2A and an outer portion 2B surrounding the core. The refractive indices of the core 2A and the outer portion 2B have the same relationship as those of the FIG. 6 light wave passage portion 91, base plate 92 and upper layer 93, as expressed by the inequality (1). At least one of the core 2A and the outer portion 2B is made of a nonlinear optical substance which is 2-methyl-4-nitroaniline, 4-(N, N-dimethyl-amino)-3-acetoamidonitrobenzene, 3,5-dimethyl-1-)4-nitrophenyl)pyrazole, or the like. The phase difference plate 6 is provided to optimize the relationship between the orientation of the crystal of the core 2A and the direction of the polarization of the light to heighten the efficiency of wavelength conversion. In the converter 2, the laser light L1 entered into the core 2A acts as fundamental waves for Cerenkov radiation so that secondary higher harmonics are generated from the light, and go out as converted light L2 from the light outgoing end surface 2b of the core. Since the converted light L2 spreads to form a ring of light, it enters the conically-shaped collimation lens 3 so that the light is collimated into mutually parallel rays by the lens. After collimation, the converted light L2 can be condensed to a diffraction limit by a condensation lens not shown in the drawings, and is thereafter used for the reading of an optical disk or for the like.

Figure 2:
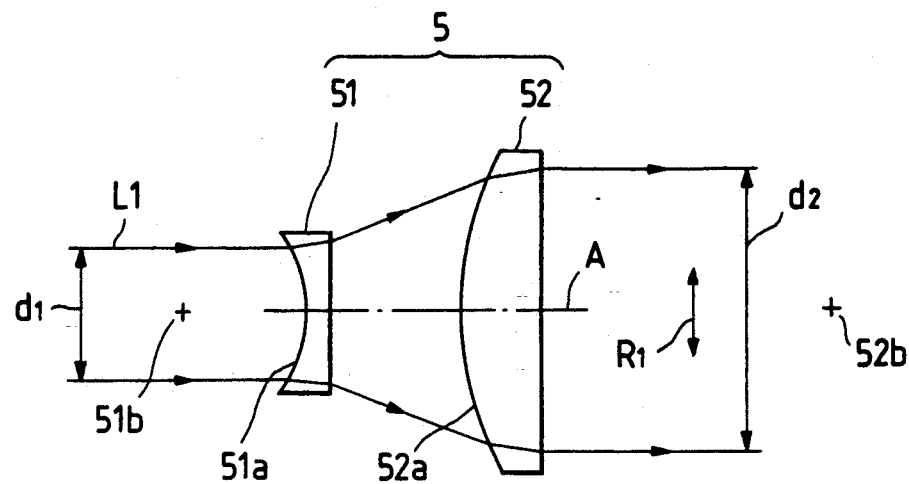
FIG. 2 is a plain view of the beam shaping lens assembly of the unit.

FIG. 2 is a plain view of the beam shaping lens assembly 5 constituted by the pair of cylindrical lenses 51 and 52 having cylindrical surfaces 51a and 52a, for which the generatrix lines are perpendicular to the optical axis A of the assembly. The cylindrical surface 51a of the lens 51 is concave, while that of 52a of the other lens 52 is convex. An axis 51b consisting of the centers of curvature of the cylindrical surface 51a is parallel with another axis 52b consisting of the centers of curvature of the other cylindrical surface 52a. The lens assembly 5 can enlarge the cross-section of the beam of the laser light L1 only in a direction R1 perpendicular to the optical axis A and the axes 51b and 52b. The ratio M of the enlargement in the direction R1 can be expressed by the focal length $f_{51}$ of the cylindrical lens 51 and $f_{52}$ of the other cylindrical lens 52 as follows:

$$M = \frac{f_{52}}{f_{51}} = \frac{d_2}{d_1} \qquad \text{equation (2)}$$

In the equation (2), $d_1$ and $d_2$ denote the diameters of the beam of the laser light L1 in the direction R1 in front of and behind the lens assembly 5, respectively. If the direction R1 is made coincident with the minor axis of the elliptic cross-section of the beam coming out from the collimation lens 4 and the focal lengths $f_{51}$ and $f_{52}$ are appropriately determined, the cross-section can be enlarged in the direction so as to be circularly shaped.

Since the beam shaping lens assembly 5 constituted by the cylindrical lenses 51 and 52 can shape the cross-section of the beam of the laser light L1 without bending the optical path thereof, the optical axis of the light source unit can be made straight as a whole to render the unit compact.

Figure 3:
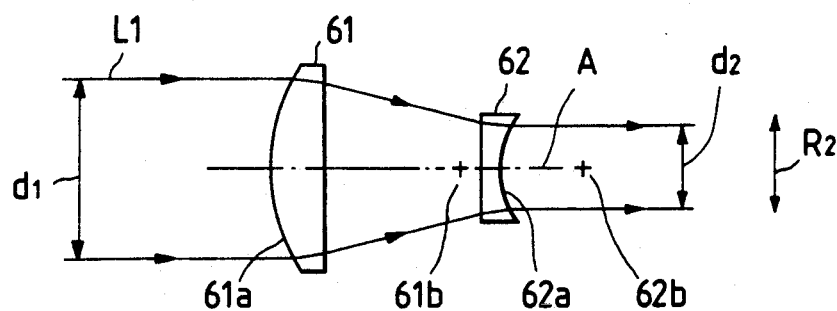
FIG. 3 is a plain view of a beam shaping lens assembly which is a modification of such assembly.

FIG. 3 is a plain view of another modification of the beam shaping lens assembly 5. The assembly includes a cylindrical lens 61 having a convex cylindrical surface 61a and constituting the light incoming side of the assembly, and another cylindrical lens 62 having a concave cylindrical surface 62a and constituting the light outgoing side of the assembly. The cross-section of the beam of the laser light L1 entering into the assembly is reduced in a direction R2 perpendicular to the optical axis A and axes 61b and 62b consisting of the centers of curvature of the cylindrical surfaces 61a and 62a of the lenses 61 and 62 of the assembly. The ratio M of the reduction can be expressed by the focal lengths $f_{61}$ and $f_{62}$ of the lenses 61 and 62 as follows:

$$M = \frac{f_{62}}{f_{61}} = \frac{d_2}{d_1} \qquad \text{equation (3)}$$

In equation (3), $d_1$ and $d_2$ denote the diameters of the beam of the laser light L1 in the direction R2 in front of and behind the lens assembly, respectively. If the direction R2 is made coincident with the major axis of the elliptic cross-section of the laser beam coming out from the collimation lens 4 and the focal lengths $f_{61}$ and $f_{62}$ are appropriately determined, the cross-section can be reduced in the direction so as to be circularly shaped.

Figure 4:
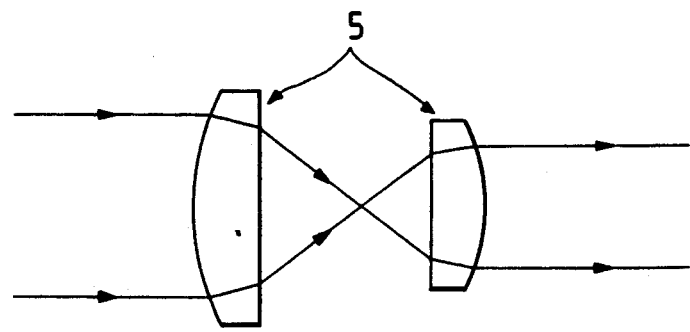
FIG. 4 is a plain view of a beam shaping lens assembly which is another modification of such assembly.

FIG. 4 is a plain view of a beam shaping lens assembly which is another modification of beam shaping lens assembly 5. The assembly includes two cylindrical lenses having convex cylindrical surfaces and constituting the light incoming and outgoing sides of the assembly. The elliptic cross-section of the beam of the laser light L1 entered into the assembly is enlarged or reduced in a direction perpendicular to the optical axis A and axes consisting of the centers of curvature of the cylindrical surfaces of the lenses. The enlargement or the reduction is performed depending on which of the focal lengths $f_1$ and $f_2$ of the lenses is larger than the other. The ratio M of the enlargement or reduction can be expressed as follows:

$$M = \frac{f_2}{f_1}$$

If the direction is made coincident with the minor or major axis of the elliptic cross-section of the laser beam coming out from the collimation lens 4 and the focal lengths $f_1$ and $f_2$ are appropriately determined, the cross-section can be enlarged or reduced in the direction so as to be circularly shaped.

Figure 5A:
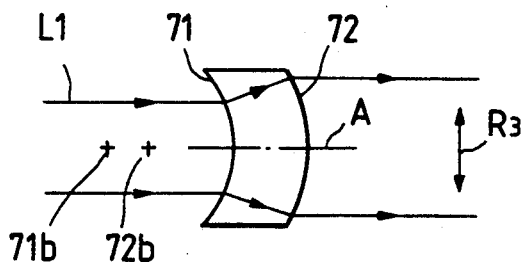
FIG. 5(a) is a plain view of a beam shaping lens which is yet another modification of the beam shaping lens assembly.

FIG. 5(a) is a plain view of a beam shaping lens assembly which is yet another modification of the beam shaping lens assembly 5. The lens has a concave cylindrical surface 71 constituting the light incoming side of the lens, and a convex cylindrical surface 72 constituting the light outgoing side of the lens. If a direction R3 perpendicular to the optical axis A and axes 71b and 72b consisting of the centers of curvature of the cylindrical surfaces 71 and 72 is made coincident with the minor axis of the elliptic cross-section of the beam of the laser light L1 coming out from the collimation lens 4, the cross-section can be enlarged in the direction so as to be circularly shaped.

Figure 5B:
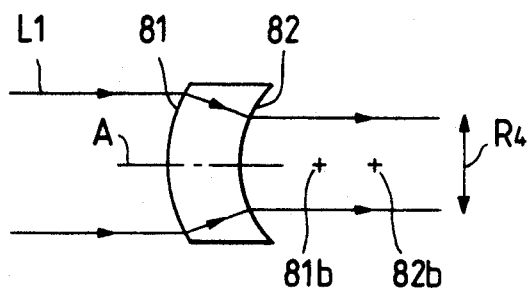
FIG. 5(b) is a plain view of a beam shaping lens which is yet still another modification of the beam shapping lens assembly.

FIG. 5(b) is a plain view of a beam shaping lens which is yet another modification of the beam shaping lens assembly 5 of the embodiment. The lens has a convex cylindrical surface 81 constituting the light incoming side of the lens, and a concave cylindrical surface 82 constituting the light outgoing side of the lens. If a direction R4 perpendicular to the optical axis A and axes 81b and 82b consisting of the centers of curvature of the cylindrical surfaces 81 and 82 is made coincident with the major axis of the elliptic cross-section of the beam of the laser light L1, the cross-section can be reduced in the direction so as to be circularly shaped.

Figure 5C:
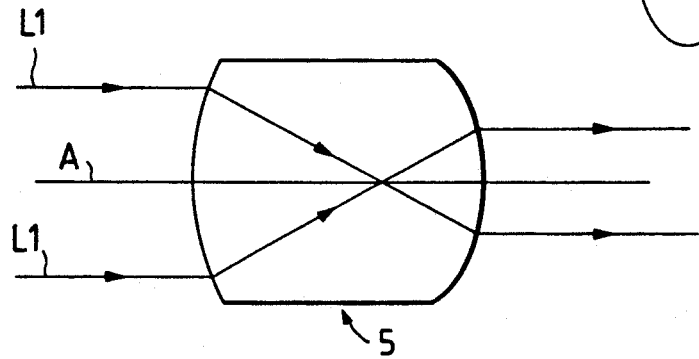
FIG. 5(c) is also a plain view of a modification of the beam shaping lens assembly.

FIG. 5(c) is a plain view of a beam shaping lens which is yet another modification of the beam shaping lens assembly 5 of the embodiment. The lens has convex cylindrical surfaces constituting the light incoming and outgoing sides of the lens. If a direction perpendicular to the optical axis A and axes consisting of the centers of curvature of the cylindrical surfaces is made coincident with the minor or major axis of the elliptic cross-section of the beam of the laser light L1, the cross-section can be enlarged or reduced in the direction so as to be circularly shaped.

The invention is not limited to the preferred embodiment and the modifications, but may be embodied or practiced in other various ways without departing from its spirit or essential character. For example, three or more lenses may be provided instead of the beam shaping lens assembly or the beam shaping single lens. The secondary higher harmonics may be generated without using the phase difference plate 6 which is for heightening the efficiency of wavelength conversion. The converted light L2 coming out from the wavelength converter 2 may not be collimated into the mutually parallel rays by the collimation lens 3 before being condensed. Instead of the collimation lens 3, a Fresnel lens may be provided to change the converted light L2 into the mutually parallel rays.

Since a light source unit provided in accordance with the present device can circularly shape the cross-section of the beam of laser light without bending the optical path thereof, the optical axis of the unit can be made straight to render the unit compact.

We claim:

1. A light source unit comprising:
    a laser source for generating a laser light beam having a fundamental wavelength and a generally elliptical shape in cross-section;
    a beam shaping assembly for converting the elliptically shaped in cross-section laser beam from the laser unit into a circularly shaped in cross-section beam, the beam shaping assembly including at least one lens having a cylindrical surface and an optical axis, the cylindrical surface having generatrix lines that are perpendicular to the optical axis of the lens; and
    a wavelength converter for receiving the light from the beam shaping assembly and for generating light of a second harmonic (half wavelength of the fundamental).

2. A light source unit according to claim 1, wherein the wavelength converter comprises an optical fiber type converter having a nonlinear optical material core.

3. A light source unit according to claim 1, wherein the wavelength converter comprises an optical fiber type converter having a nonlinear optical material surrounding the core.

4. A light source unit according to claim 1, wherein the wavelength converter comprises an optical fiber type converter having a nonlinear optical material core and a nonlinear optical material surrounding the core.

5. A light source unit according to claims 2, 3, or 4 wherein the nonlinear optical fiber material is selected from the group consisting of $KH_2PO_4$, $LiNbO_3$, $LiTaO_3$, 2-methyl-4-nitrileaniline, 4-dimethylamino-3-acetoamidnitrobenzone, and 3,5-dimethyl-1-(4-nitrophenyl) pyrazole.

6. A light source unit as in claim 2, wherein the core nonlinear optical material is surrounded by quartz.

7. A light source unit as in claim 2, wherein the core nonlinear optical material is surrounded by glass.

8. A light source unit according to claim 1, wherein the laser source comprises a semiconductor laser.

9. A light source unit according to claim 1, further comprising:
    a collimation lens for collimating the beam of light leaving the laser source before it impinges upon the beam shaping lens assembly.

10. A light source unit according to claim 1, wherein the beam shaping lens assembly comprises:
    a first cylindrical lens having a concave cylindrical surface for receiving light, and
    a second cylindrical lens for receiving light from the first cylindrical lens, having a convex cylindrical surface through which light enters.

11. A light source unit according to claim 1, wherein the beam shaping lens assembly comprises:
    a first cylindrical lens having a convex cylindrical surface for receiving light; and
    a second cylindrical lens for receiving light from the first cylindrical lens, having a concave cylindrical surface through which light exits.

12. A light source unit according to claim 1, wherein the beam shaping assembly comprises:
    a first cylindrical lens having a convex cylindrical surface for receiving light; and
    a second cylindrical lens for receiving light from the first cylindrical lens, having a convex cylindrical surface through which light exits.

13. A light source unit according to claim 1, wherein the beam shaping assembly comprises:
    a cylindrical lens having a convex cylindrical surface for receiving light and another convex cylindrical surface through which light exits.

14. A light source unit according to claim 1, wherein the beam shaping assembly comprises:
    a cylindrical lens having a concave cylindrical surface for receiving light and a convex cylindrical surface for through which light exits.

15. A light source unit according to claim 1, wherein the beam shaping assembly comprises:
    a cylindrical lens having a convex cylindrical surface for receiving light and a concave cylindrical surface through which light exits.

16. A light source unit according to claim 1, further comprising:
    a phase difference plate which is interposed in the path of the circular in cross-section shaped beam of laser light before it enters the wavelength converter.

17. A light source unit according to claim 1, further comprising:
    a condensation lens which is interposed in the light path between the phase difference plate and the wavelength converter.

18. A light source unit according to claim 1, further comprising:
    a collimation lens which receives light leaving the wavelength converter.

19. A light source unit according to claim 1, further comprising:
    a fresnel lens which receives light leaving the wavelength converter.

* * * * *